United States Patent
Maliuk

(10) Patent No.: US 11,310,469 B2
(45) Date of Patent: Apr. 19, 2022

(54) SURVEILLANCE APPARATUS AND A SURVEILLANCE METHOD FOR INDICATING THE DETECTION OF MOTION

(71) Applicant: Canon Europa N.V., Amstelveen (NL)

(72) Inventor: Alexandar Andreevich Maliuk, Sofia (BG)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/831,950

(22) Filed: Dec. 5, 2017

(65) Prior Publication Data
US 2018/0167591 A1    Jun. 14, 2018

(30) Foreign Application Priority Data
Dec. 9, 2016    (GB) ..................................... 1620991

(51) Int. Cl.
| | | |
|---|---|---|
| *H04N 7/18* | (2006.01) | |
| *G06T 7/20* | (2017.01) | |
| *G06K 9/00* | (2022.01) | |
| *G06K 9/32* | (2006.01) | |
| *H04N 5/14* | (2006.01) | |

(52) U.S. Cl.
CPC ......... *H04N 7/188* (2013.01); *G06K 9/00771* (2013.01); *G06K 9/3241* (2013.01); *G06T 7/20* (2013.01); *H04N 5/144* (2013.01); *H04N 7/181* (2013.01)

(58) Field of Classification Search
CPC .... H04N 7/188; H04N 7/181; H04N 5/23238; H04N 5/247; H04N 5/33; H04N 7/18; G06T 7/20

USPC ........................................................ 348/143
See application file for complete search history.

(56) References Cited

U.S. PATENT DOCUMENTS

| 8,284,258 B1 | 10/2012 | Cetin et al. |
| 2003/0108222 A1 | 6/2003 | Sato et al. |

(Continued)

FOREIGN PATENT DOCUMENTS

| CN | 102047654 A | 5/2011 |
| CN | 104272345 A | 1/2015 |

(Continued)

OTHER PUBLICATIONS

Robert T. Collins, et al., "Algorithms for Cooperative Multisensor Surveillance", Proceedings of the IEEE, vol. 89, No. 10, Oct. 2001, pp. 1456-1477.

(Continued)

*Primary Examiner* — Masum Billah
(74) *Attorney, Agent, or Firm* — Canon U.S.A., Inc. IP Division

(57) ABSTRACT

A surveillance apparatus for indicating the detection of motion is provided that can perform a surveillance method. A motion detection unit is configured to detect motion of an object in the field of view of a camera. A processor is configured to identify a region of video data captured by the camera that includes the motion of the object. A determination unit is configured to determine perimeter data that represents at least a portion of a perimeter of the region of the video data. A combining unit is configured to combine the perimeter data with a video feed captured by a different camera.

10 Claims, 9 Drawing Sheets

(56) References Cited

U.S. PATENT DOCUMENTS

| | | | | |
|---|---|---|---|---|
| 2004/0075738 | A1* | 4/2004 | Burke | G08B 13/19656 |
| | | | | 348/143 |
| 2007/0230744 | A1* | 10/2007 | Dronge | G08B 13/194 |
| | | | | 382/103 |
| 2008/0152193 | A1 | 6/2008 | Takamori | |
| 2008/0310734 | A1* | 12/2008 | Ahammad | G06K 9/00711 |
| | | | | 382/209 |
| 2010/0259684 | A1* | 10/2010 | Kambe | H04N 21/4312 |
| | | | | 348/598 |
| 2014/0267737 | A1 | 9/2014 | Kitagawa | |
| 2016/0170577 | A1* | 6/2016 | Meganathan | G06F 3/0482 |
| | | | | 348/159 |
| 2019/0228556 | A1* | 7/2019 | Wang | G06F 3/01 |

FOREIGN PATENT DOCUMENTS

| | | | |
|---|---|---|---|
| CN | 105704439 A | 6/2016 | |
| CN | 105915847 A | 8/2016 | |
| CN | 106210613 A | 12/2016 | |
| JP | 2010206475 A | 9/2010 | |
| JP | 2011008579 A | 1/2011 | |
| JP | 2013066016 A | 4/2013 | |
| JP | 2016163075 A | 9/2016 | |
| WO | WO-9828706 A1 * | 7/1998 | G08B 13/19602 |
| WO | 2015194141 A1 | 12/2015 | |

OTHER PUBLICATIONS

Li Fang, et al, "Smart Motion Detection Surveillance System", 2009 International Conference on Education Technology and Computer, Oct. 2009, pp. 171-175.

* cited by examiner

SURVEILLANCE APPARATUS AND A SURVEILLANCE METHOD FOR INDICATING THE DETECTION OF MOTION

CROSS REFERENCE TO RELATED APPLICATION

This application claims the benefit under 35 U.S.C. § 119(a)-(d) of United Kingdom Patent Application No. 1620991.8, filed on Dec. 9, 2016 and entitled "A surveillance apparatus and a surveillance method for indicating the detection of motion". The above cited patent application is incorporated herein by reference in its entirety.

TECHNICAL FIELD

The present invention relates to a surveillance apparatus, a surveillance method, a program, and a computer-readable storage medium, and in particular relates to indicating the detection of motion.

BACKGROUND

Surveillance systems are typically arranged to monitor surveillance data received from a plurality of data capture devices. A viewer may be overwhelmed by large quantities of data captured by a plurality of cameras. If the viewer is presented with video data from all of the cameras, then the viewer will not know which of the cameras requires the most attention. Conversely, if the viewer is presented with video data from only one of the cameras, then the viewer may miss an event that is observed by another of the cameras.

An assessment needs to be made of how to allocate resources so that that the most important surveillance data is viewed or recorded. For video data that is presented live, presenting the most important information assists the viewer in deciding actions that need to be taken, at the most appropriate time. For video data that is recorded, storing and retrieving the most important information assists the viewer in understanding events that have previously occurred. Providing an alert to identify important information ensures that the viewer is provided with the appropriate context in order to access whether captured surveillance data requires further attention.

The identification of whether information is important is typically made by the viewer, although the viewer can be assisted by the alert identifying that the information could be important. Typically, the viewer is interested to view video data that depicts the motion of objects that are of particular interest, such as people or vehicles.

There is a need for detected motion to be given priority if it is identified as being more important than other motion that has been detected. It is useful to provide an alert to the viewer so that they can immediately understand the context of the event, so that an assessment can be made of whether further details are required. This is achieved by generating an alert that includes an identification of the moving object or the type of motion detected.

US 2016/0170577 pertains to providing a background contextual image which is overlaid by a semi-transparent alarm. If a presented alarm is selected, this causes a video to start playing. Consequently, this is restricted to providing playback of previously recorded video that has been associated with a stored alarm.

The alarms are restricted to icons and text, and so the only way for the viewer to resolve difficulties encountered when interpreting the icons and text is to view the video that is associated with the alarm. This has the potential to result in the viewer being distracted by information that is not relevant, wasting time and effort to understand an alarm, while missing information captured by another camera that is much more important.

No disclosure is provided by US 2016/0170577 of how to resolve the burden that is encountered in generating the alarms, so that they provide the viewer with text and icons that are appropriate to the captured event.

In fact, US 2016/0170577 fails to recognise that a compromise needs to be made between the quality of the content of the alarm and the resources that are required to generate the alarm. The omission of information from the alert makes it difficult for the viewer to assess whether further details are required, and so the viewer must invest resources in better understanding the nature of the event that triggered the alert.

A problem has been identified that surveillance data from a data capture device is used to generate an alert, which is displayed to a viewer so that an assessment can be made of whether to view the surveillance data.

SUMMARY

Aspects of the present invention are set out by the independent claims.

According to a first aspect there is provided a surveillance apparatus for indicating the detection of motion, comprising: a motion detection unit configured to detect motion of an object in the field of view of a camera; a processor configured to identify a region of video data captured by the camera that includes the motion of the object; a determination unit configured to determine perimeter data that represents at least a portion of a perimeter of the region of the video data; and a combining unit configured to combine the perimeter data with a video feed captured by a different camera. Advantageously, the perimeter data can be used to determine whether to view the video feed from the camera for which motion has been detected, or to continue viewing video feed captured by the different camera. Consequently, the perimeter data can serve as an alert, to identify that motion has been detected by a camera that is not presently being displayed. The perimeter data is therefore useful for inferring properties of the motion of the object, for example, properties of motion such as speed and periodicity, or properties of the object. The perimeter data to be displayed live or stored in a memory so that it can be subsequently retrieved. The perimeter data can represent the full perimeter of the object. Alternatively, the perimeter data can represent a portion of the perimeter of the object, for example, if the some of the object is not in the field of view of the camera.

Optionally, the perimeter traces a shape of the moving object. Advantageously, a viewer of a video feed which has been combined with perimeter data will be able to see the shape of the object. This is useful for determining whether to view the video feed from the camera for which motion has been detected. The shape of an object is very useful for determining the type of object that has been detected, and consequently the user could identify that the object is a person or a vehicle.

Optionally, the surveillance apparatus further comprises: a creating unit configured to create a visual representation of the perimeter data. Advantageously, the visual representation can be displayed to a viewer, either live at the time of capture, or as a recording during playback.

Optionally, the visual representation comprises at least the portion of the perimeter. Advantageously, if at least the portion of the perimeter is displayed to the viewer, the user can decide whether to switch camera while the video feed from the different camera continues to be displayed to the viewer.

Optionally, the visual representation comprises the region enclosed by at least the portion of the perimeter. Advantageously, if the region is displayed to the viewer, the user can decide whether to switch camera while the video feed from the different camera continues to be displayed to the viewer.

Optionally, the visual representation comprises an identification of the camera for which motion has been detected. Advantageously, the viewer is informed which camera has captured the detected motion. For example, the identification could be a label associated with the perimeter, or an icon that identifies the camera associated with the perimeter. Alternatively, the indication could be a colour code, wherein the perimeter has a colour that is associated with the camera for which motion has been detected.

Optionally, the visual representation comprises a shortcut that includes instructions to display a video feed from the camera for which motion has been detected. Advantageously, the camera can select the shortcut, in order to navigate to the view from the camera, so that the video feed showing the motion is displayed.

Optionally, the visual representation is semi-transparent. Advantageously, the visual representation corresponding to the motion detection does not obscure the view of the video feed that is displayed.

Optionally, the surveillance apparatus further comprises: a shape recognition unit configured to identify the object from a shape that is represented by the perimeter data. Advantageously, the viewer can be provided with details of the feature that has been detected to be moving, such that the viewer can determine whether to view the video feed captured by the different camera, either by the viewer interpreting the shape, or by the shape recognition unit interpreting the shape.

Optionally, the combining unit is configured to combine the perimeter data with the video feed associated with the different camera by overlaying the video feed with at least the portion of the perimeter represented by the perimeter data. Advantageously, providing the video feed as a layer over the top of the video data ensures that the video data is preserved, allowing the perimeter data to be dismissed, to recover the display of the video data.

Optionally, the motion detection unit is configured to detect motion by performing processing of the video data. Advantageously, it is not necessary to provide a separate motion detection device, because the motion detection can instead be performed using software.

Optionally, the surveillance apparatus is further arranged, wherein: the motion detection unit is further configured to detect motion of a further object in the field of view of a further camera; the processor is further configured to identify a further region of further video data captured by the further camera that includes the motion of the further object; the determination unit is further configured to determine further perimeter data that represents at least a portion of a further perimeter of the further region of the further video data; and the combining unit is further configured to combine the further perimeter data with the video feed captured by the different camera. Advantageously, a plurality of cameras for which motion has been detected can be used to create a plurality of alerts, which can each be displayed to the viewer.

Optionally, the surveillance apparatus further comprises: a selection unit configured so that a selection can be made of how the combining unit should combine the perimeter data and the further perimeter data with the video feed captured by the different camera, in the event that the parameter and the further parameter overlap. Advantageously, this allows the alerts to be presented based upon an order of priority.

Optionally, the surveillance apparatus further comprises: a display; and a plurality of cameras. Advantageously, the alert can be displayed at the time that the perimeter data is generated from the camera. Alternatively, the alert can be stored in a memory, so that it can be presented during playback of a recording.

According to a second aspect there is provided a surveillance method for indicating the detection of motion, comprising: detecting motion of an object in the field of view of a camera; identifying a region of video data captured by a camera that includes the motion of the object; determining perimeter data that represents at least a portion of a perimeter of the region of the video data; and combining the perimeter data with a video feed captured by a different camera.

According to a third aspect there is provided a program that, when implemented by a surveillance apparatus, causes the surveillance apparatus to perform a method according to the second aspect.

According to a fourth aspect there is provided a computer-readable medium storing a program according to the third aspect.

According to a fifth aspect there is provided a surveillance apparatus for indicating the detection of an event occurring in the field of view of a camera, comprising: an event detection unit configured to detect the event; a determination unit configured to determine perimeter data that represents the event; and a combining unit configured to combine the perimeter data with a video feed captured by a different camera. Advantageously, the generation of perimeter data can be triggered by the detection of an event. Accordingly, the perimeter data can be used to determine whether to view the video feed from the camera for which the event is occurring, or to continue viewing video feed captured by the different camera. Optionally, the fifth aspect includes any of the features of the above aspects.

Optionally, the event corresponds to the detection of an object by the camera; and the perimeter data comprises at least a portion of a perimeter of the object. Advantageously, it can be inferred from the event that the object can be detected by the camera, in which case the perimeter data is generated that is based on the object. Examples of events that correspond to the detection of an object include the triggering of an alert that indicates that a person or vehicle is likely to have been captured by the camera, such as a doorbell or a card reader, or an alarm being activated.

Optionally, the event indicates the presence of an object, which results a determination that the object is being captured by the camera; and the perimeter data comprises at least a portion of a perimeter of the object. Advantageously, object recognition can be used to process the video feed from the camera, such that an event corresponds to the detection of an object. For example, a determination could be made that a person or a vehicle has been detected, in which case an event is triggered that results in at least a portion of a perimeter of the object being used to generate the perimeter data.

According to a sixth aspect there is provided a surveillance method for indicating the detection of an event occurring in the field of view of a camera, comprising: detecting the event; determining perimeter data that represents the event; and combining the perimeter data with a video feed captured by a different camera.

BRIEF DESCRIPTION OF THE DRAWINGS

Embodiments will now be described, by way of example only, with reference to the accompanying drawings, in which.

DETAILED DESCRIPTION

Various exemplary embodiments, features, and aspects of the invention will be described in detail below with reference to the drawings. Each of the embodiments of the present invention described below can be implemented solely or as a combination of a plurality of the embodiments or features thereof where necessary or where the combination of elements or features from individual embodiments in a single embodiment is beneficial.

Figure 1A:
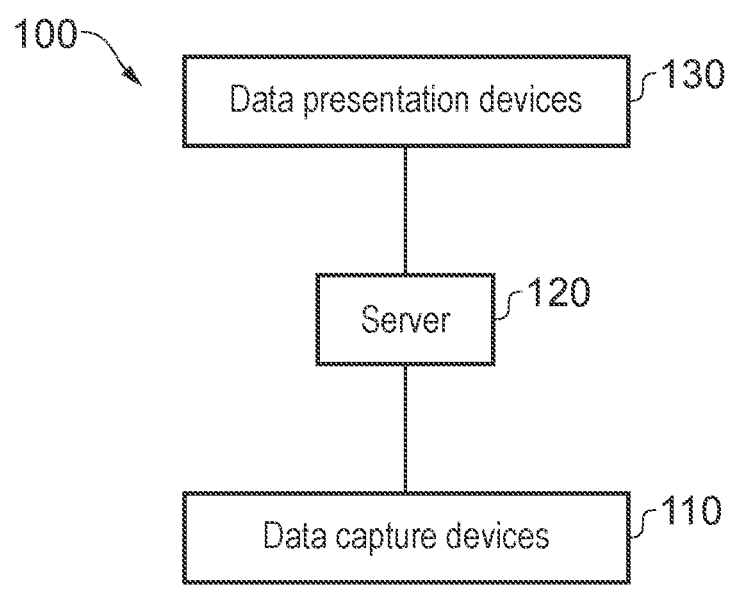
FIG. 1A is a block diagram which identifies features of a surveillance system.
Figure 1B:
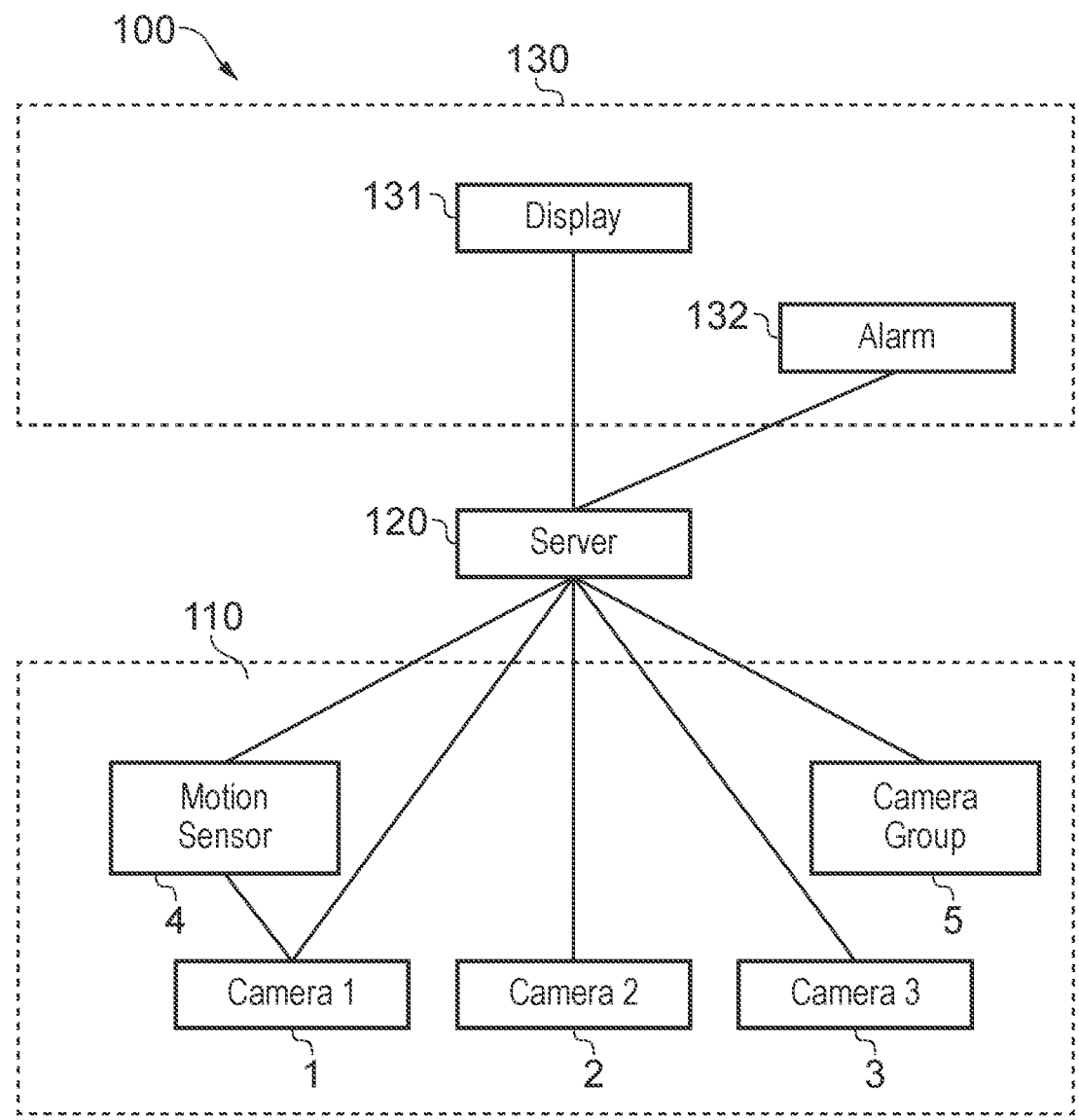
FIG. 1B is a block diagram that includes further details of the features of the surveillance system.
Figure 1C:
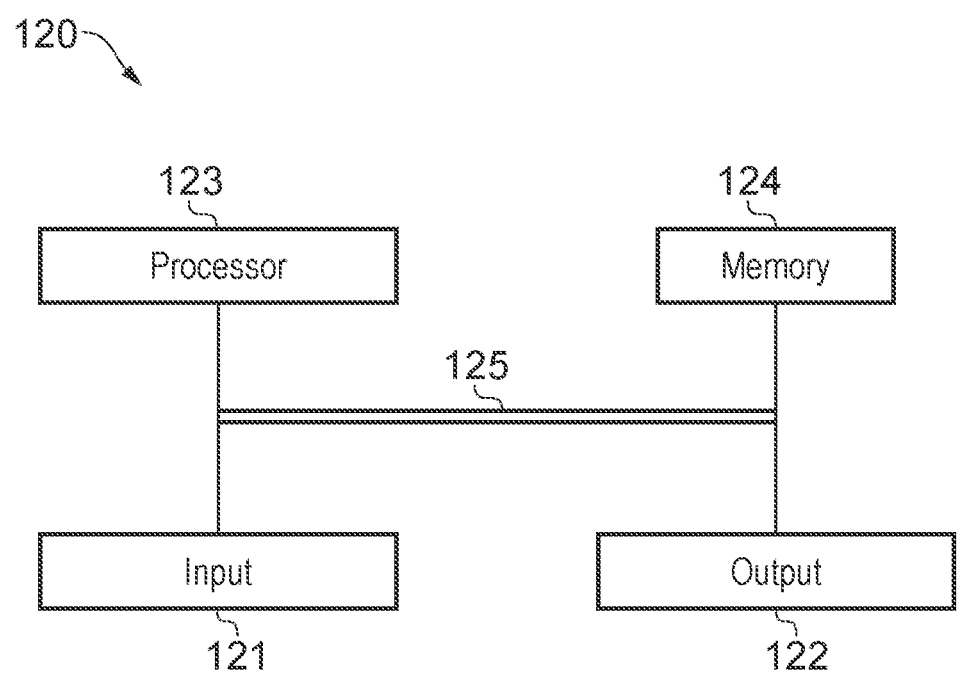
FIG. 1C is a block diagram which identifies features of a server of the surveillance system.

FIGS. 1A-1C identify features of a surveillance system.

FIG. 1A shows that the surveillance system 100 includes data capture devices 110 which provide data to a server 120, with this data being presented using data presentation devices 130. Users of the surveillance system 100 include viewers and administrators. The data presentation devices 130 allow a viewer to observe video data captured by the data captured devices 110. The server 120 can be configured by an administrator making the selection of settings, so that the viewer is presented with appropriate information.

FIG. 1B provides further detail of the surveillance system shown in FIG. 1A. Data capture devices 110 include cameras 1-3, a motion sensor 4 and microphones (not shown). The data capture devices 110 further includes a plurality of cameras that are addressed as a camera group 5. The camera group 5 could address the plurality of cameras 1-3, or alternatively could include a different set of cameras (not shown). Data presentation devices 130 include a display 131 and an alarm 132.

FIG. 1C provides further detail of the server 120 shown in FIGS. 1A and 1B. An input 121 receives data from the data capture devices 110 and an output 122 transmits data to the data presentation devices 130. The server further includes a processor 123 and a memory 124. The memory 124 of the server 120 is configured to record the video data received from the data capture devices 110. The memory 124 is further configured to store data that is generated by the processor 123, including analysis that is generated based on video data. The components of the server 120 communicate via a bus 125.

Figure 2A:
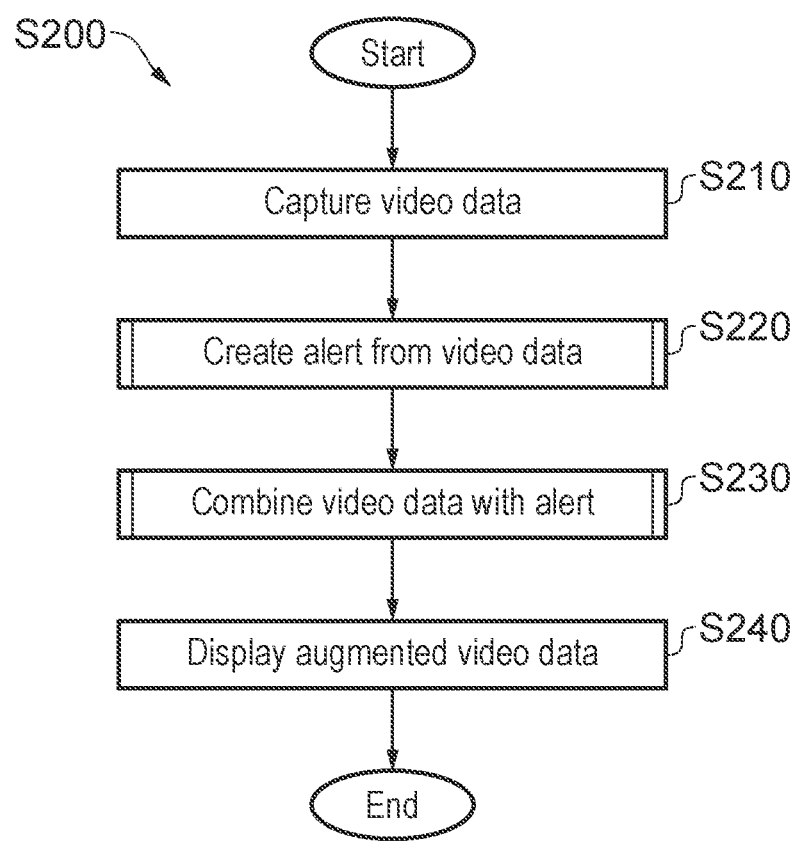
FIG. 2A is a flow chart that demonstrates how the surveillance system is used to combine video data with an alert that identifies motion detection.
Figure 2B:
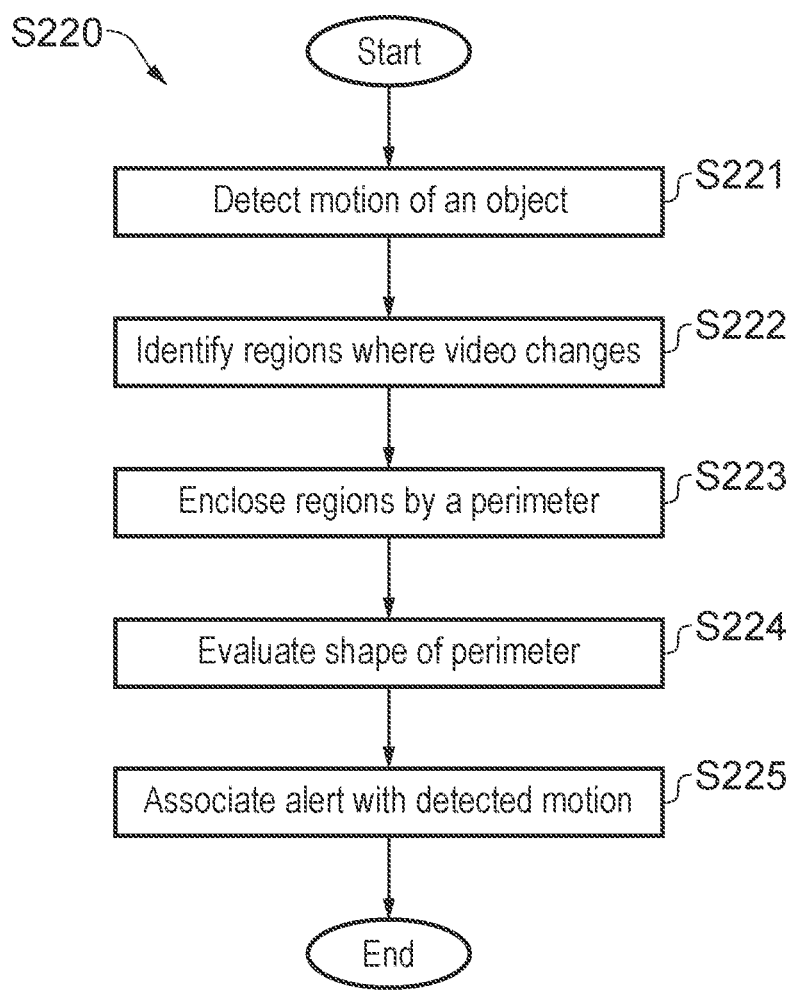
FIG. 2B is a flow chart that demonstrates how an alert is created that identifies motion detection.
Figure 2C:
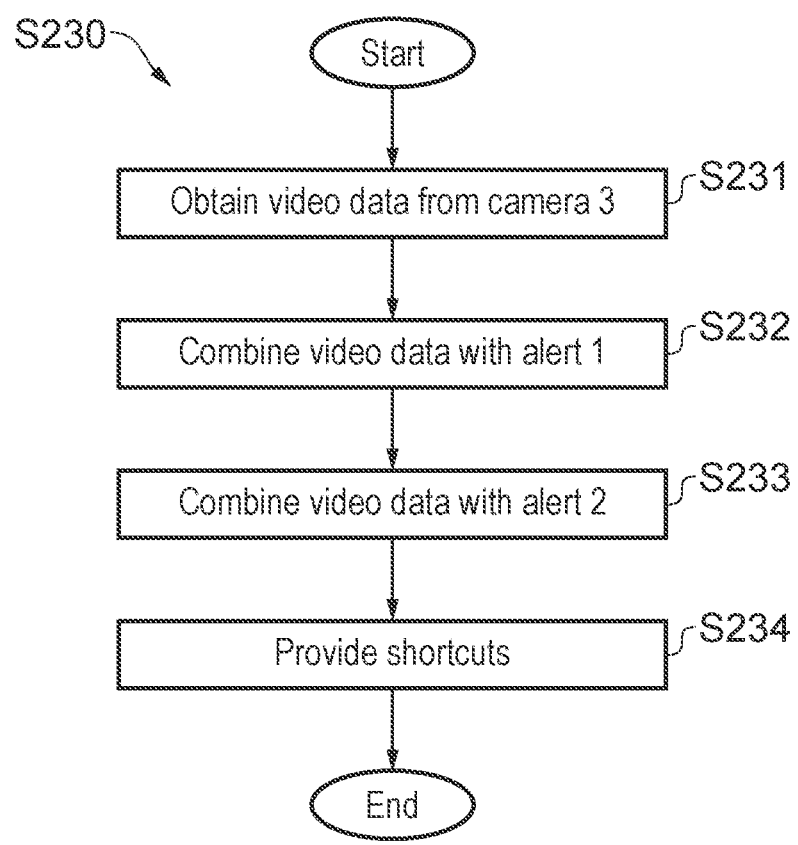
FIG. 2C is a flow chart that demonstrates how to combine video data with one or more of the alerts that have been created.

FIGS. 2A-2C provide details of the method used by the surveillance system 100 to display data that has been captured. An illustration of how the method works is presented by considering a display of video data from camera 3 that has been combined with alerts that are based on video data captured by cameras 1 and 2. However, this specific arrangement can be generalised so that so that the video feed from any of the cameras can be combined with alerts. The term combining unit refers to any features that can be used to combine the perimeter data with a video feed, such as the processor 123 of the server 120.

FIG. 2A demonstrates the method S200 of displaying video data that has been augmented by an alert that identifies motion detection. The term augmented refers to the captured video data being taken in combination with one or more alerts, and includes the video data being accompanied by these alerts, and also includes the video data being modified to include these alerts. The term alert refers to any feature that serves to indicate that motion has been detected. The term creating unit refers to any features that can be used to create an alert, such as the processor 123 of the server 120.

In step S210, video data is captured by the data capture devices 110. The video data includes the video feed from the data capture devices 110, the video feed comprising a plurality of frames captured by the cameras 1-3 of the data capture devices 110. The video data also comprises sound data that has been captured by microphones (not shown) of the data capture devices 110, since each camera 1-3 can be configured to include an integral microphone. The video data further includes any metadata associated with the captured video data such as information that identifies the data capture devices 110. The term video data could also refer to any augmentation that has been made to the video feed that is received by the server 120 from the data capture devices 110. For example, a video feed from camera 3 that has been augmented by alerts could be considered video data. However, alerts associated with camera 1 and camera 2 may not necessarily modify the data that is received from camera 3, because instead there is a possibility that the alerts are stored as a separate layer that is displayed as an overlay with respect to the video data received from camera 3.

In step S220, an alert is created based on the captured video data obtained from step S210. Further details of step S220 are provided in FIG. 2B, as discussed below.

In step S230, video data is combined with the alert. This is achieved by augmenting the video data to include the alert created in step S220. Further details of step S230 are provided in FIG. 2C, as discussed below.

In step S240, the data presentation devices 130 display the video data that has been augmented to include the alert. The server 120 is configured to transmit video data that has been augmented to include the alert, via the output 122, to the data presentation devices 130. Furthermore, a plurality of alerts can be transmitted by output 122 of the server 120. For example, the alerts being associated with camera 1 and camera 2 can be transmitted to augment the transmitted video feed from camera 3. In addition to the displaying of the alert by the display 131, there is also a possibility of the alarm 132 being triggered, which provides the viewer with an additional signal that important information is available for viewing. Note that the feature of displaying the augmented video data is optional, because it is not necessary that the augmented video feed is displayed by the display 131, since there is the possibility for the augmented video feed to instead be stored by the memory 124 of the server 120, which can be subsequently be retrieved using a playback function.

FIG. 2B provides further details of step S220 regarding the creation of the alert from the video data. The alert is a visual representation of the perimeter data, which is created by a creating unit, such as the processor 123 of the processor 120.

In step S221, it is identified that motion of an object has been detected, the motion detection being achieved by the processor 123 of the server 120 performing processing of video data received from the data capture devices 110. Alternatively, motion can be detected using the motion sensor 4 to inform the server 120 that motion has been detected that can be observed by the camera 1. Consequently, an identification is made that the motion of the object is being captured by the camera 1, with the features that are used to do this being referred to as the motion detection unit. As a further alternative, the identified motion could be obtained from metadata of the video data, which has the advantage that the metadata also identifies the camera that was used to generate the video feed. Since the motion detection in step S221 can be performed by the processor 123 analysing the data received from the camera 1, it is not necessary for the camera 1 to be associated with a motion sensor 4. Preferably, the motion detection is performed by the processor, because then the technique will work even if a motion sensor device is not available.

In step S222, one or more regions are identified for which the video changes. The term regions refers to parts of the frames of the video data for which the motion has occurred. Consequently, a comparison is made of the frames of the video feed that are received from the data capture devices 110 by the input 121 of the server 120. The processor 123 analyses the video data from camera 1 to provide details of the motion of the object, such as the identity of the object or the type of motion that is being exhibited by the object. This analysis is performed by comparing individual frames of the video data received from camera 1.

In step S223, a perimeter is identified that encloses the one or more regions of the video data that correspond to the change. Perimeter data is determined that represents the perimeter, such that the perimeter data can be used to construct the perimeter. The term determination unit refers to features that are used to determine the perimeter data, and can include the processor 123 of the server 120. It is possible that the perimeter encloses some parts of the frame for which no motion has been detected, if this is determined to be more convenient for providing a perimeter that does enclose the regions of the video data corresponding to the motion detection. The would be particularly advantageous for identifying motion detection of a person by presenting a perimeter that encloses parts of their body that are moving together with parts of the body that are not moving. The perimeter defines an interior region, which includes the one or more regions that are identified as exhibiting the motion of an object. The perimeter data could comprise a portion of the perimeter, for example, if only a portion of the object is captured.

In step S224, as an optional step, an evaluation is made of the shape of the perimeter, in order to determine the identity of the object that has caused motion to be detected. This is achieved by performing analysis of the perimeter data. The shape detection is performed by the processor 123 of the server 120, or alternatively can be performed by a viewer monitoring the data presentation devices 130. As a further alternative, the shape detection can already be stored by the video data as metadata, if the shape detection is performed by the camera 1.

Examples of the use of shape detection include:
Performing analysis of the perimeter itself, in order to infer the identity of the object.
Analysis of video data for the camera corresponding to the alert by performing shape detection of features that are enclosed by the perimeter.
If a person is detected, performing face detection to provide an indication that a person has been detected. In addition, face recognition could be performed to provide further details of the identity of the person.
If a vehicle is detected, performing licence plate detection to provide an indication that a vehicle has been detected. In addition, licence plate recognition could be performed to provide further details of the identity of the vehicle.

In step S225, an alert is generated that is associated with the detected motion of the object. The alert includes the perimeter that has been extracted from the video data in step S223. The alert further includes any details of the event that have been identified in step S224 associated with the shape of the parameter, such as the identification of the object or the nature of the motion that has been detected. The alert includes details of the camera 1 from which the video data was obtained, and any other information that would be useful to a viewer, such as the data and time that the video data was captured. The alert can also include an icon that could be presented with the alert to include the additional information associated with the alert. The additional information can be used to generate a shortcut. The alert is generated using the processor 123 and stored by the memory 124. The alert can be transmitted via the output 122 to the data presentation devices 110.

FIG. 2C provides further details of step S230 regarding the augmentation of video data to include one or more alerts. As a consequence, it is possible to present the user with a plurality of visual representations that correspond to the detection of motion of a plurality of objects by a plurality of cameras.

In step S231, video data is obtained by the server 120 from camera 3. The video data is presented to the viewer by the display 131.

In step S232, the video feed from camera 3 is combined with the alert 1 that is associated with camera 1. This alert 1 is retrieved from the memory 124, having been generated in step S225 to include the perimeter that was obtained in step S223 that was extracted from video data captured by camera 1. The augmentation of the video data from camera 3 is achieved by overlaying the perimeter as a layer on top of the video feed from camera 3. Consequently, there is no loss of data for the video feed of camera 3, and so the viewer can choose to dismiss alert 1 to recover the video feed of camera 3.

In step S233, as an optional step, alerts from further cameras can be combined with the video feed from camera 1, such as alert 2 that has been extracted from the video data of camera 2. The alerts from further cameras are generated using the technique provided in step S220, in the same way that alert 1 is generated.

In step S234, as an optional step, a shortcut is provided so that a viewer can select the display of the video feed from camera 1 based on their observation of the alert corresponding to camera 1. If the alert is presented live, then following the shortcut allows the viewer to observe the live video feed from the camera 1 associated with the alert 1. However, if the alert 1 is presented during playback, then the shortcut allows the viewer to observe the recorded video feed associated with the camera 1, such that the viewer is presented with the event that was triggered by motion of the object. The shortcut is an integral part of the alert, so can be generated in step S220 and stored in the memory 124. Alternatively, the alert can be retrieved from the memory 124 at the time when it is to be presented to include additional features such as the shortcut to the corresponding video data.

Figure 3A:
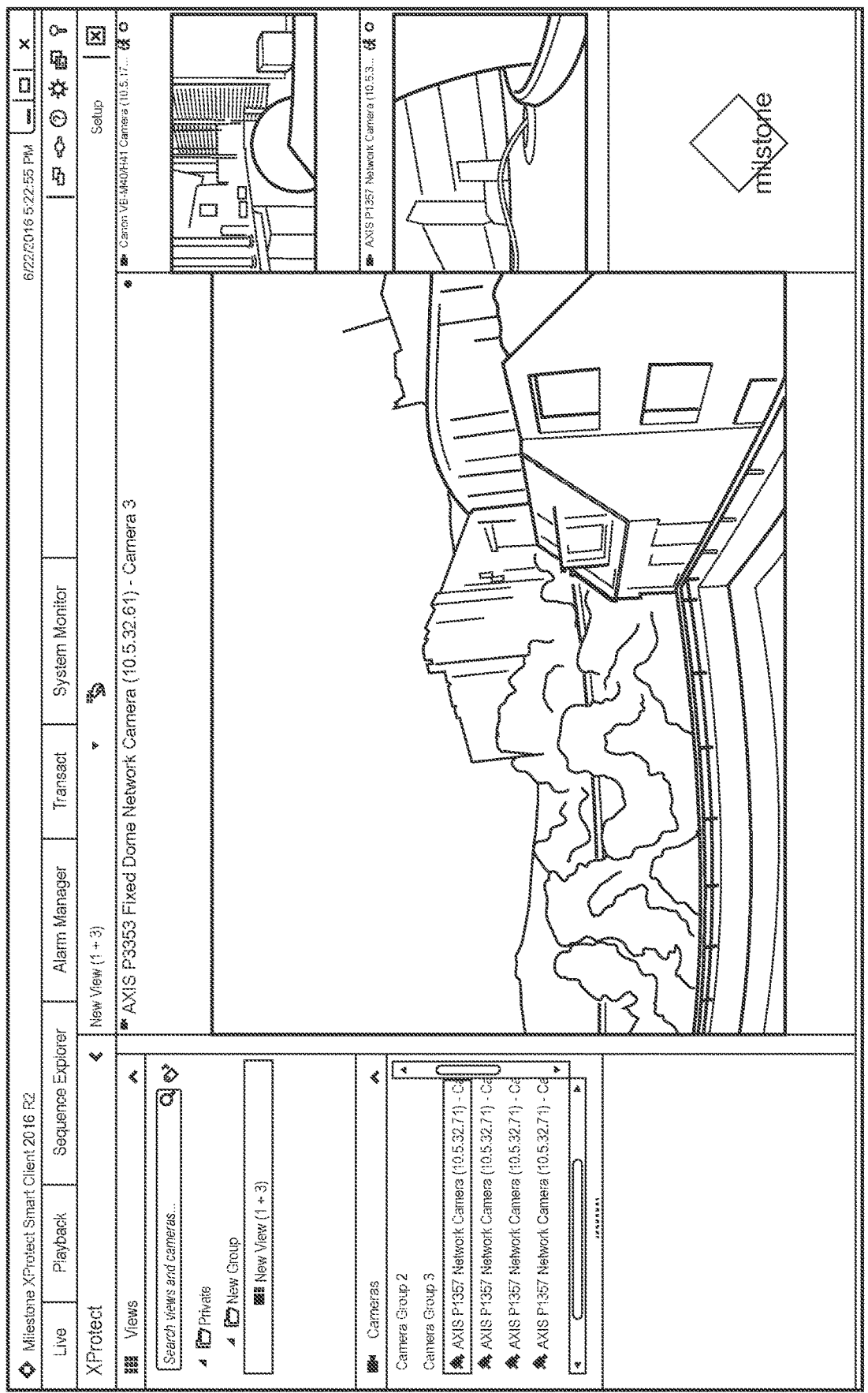
FIG. 3A is a view of a graphical user interface, arranged to show video data captured by a plurality of cameras.
Figure 3B:
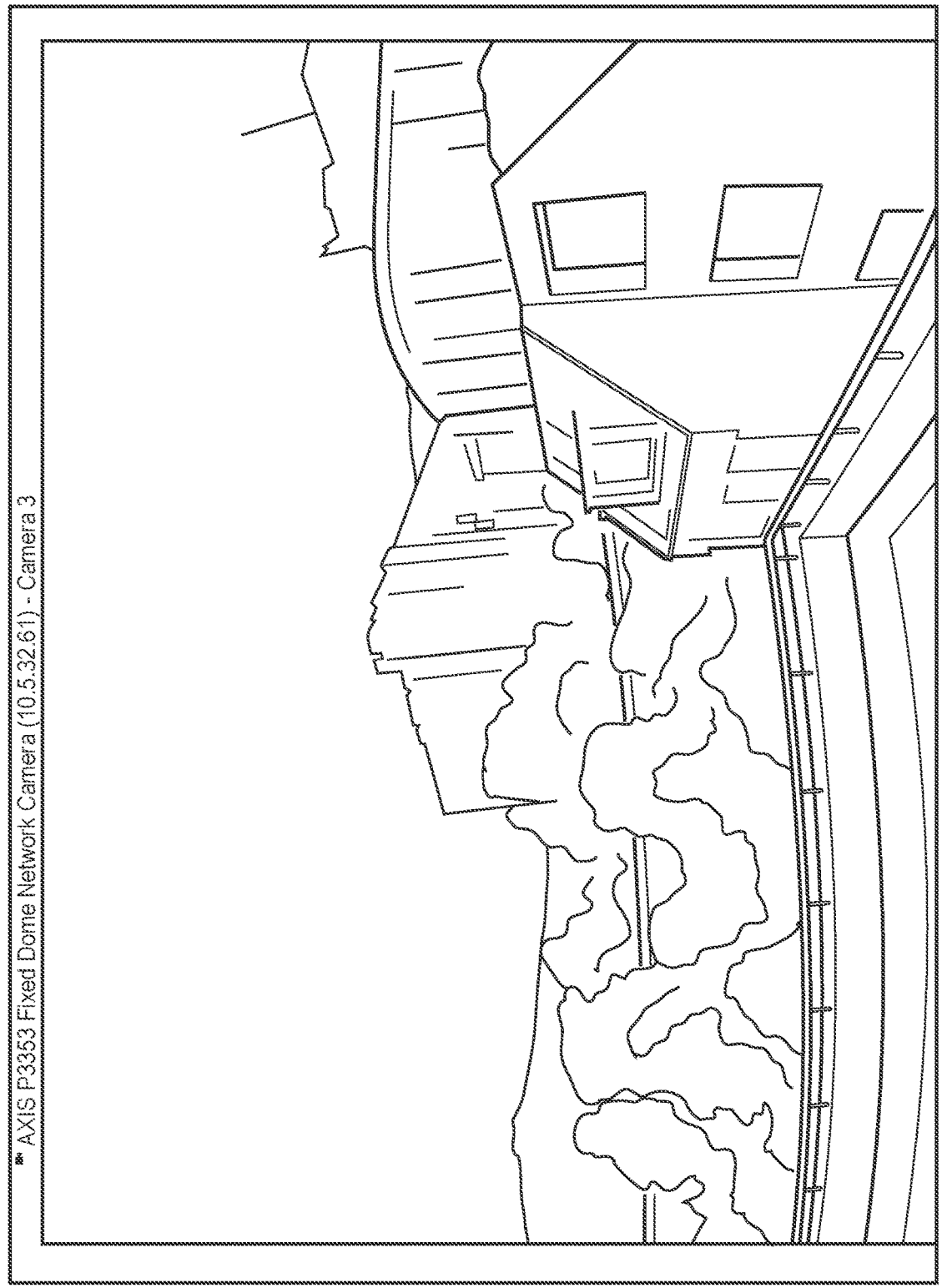
FIG. 3B is a view of the graphical user interface, arranged to present video data captured by a camera.
Figure 3C:
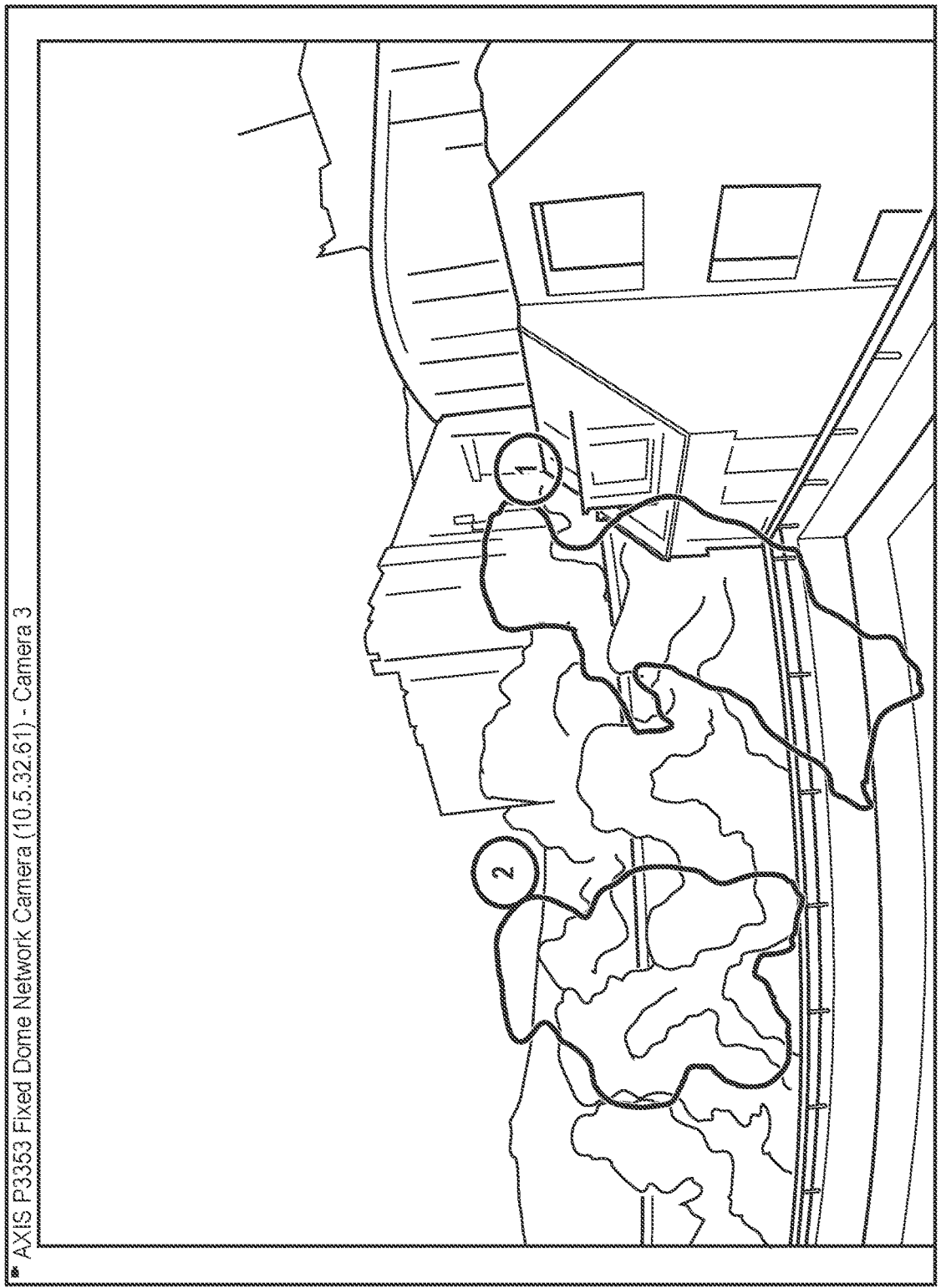
FIG. 3C is a view of the graphical user interface, arranged to show video data captured by camera that includes a plurality of alerts that identify the detection of motion.

FIGS. 3A-3C provide views of a graphical user interface (GUI). The GUI is generated by the processor 123 of the server 120, and presented to the viewer via the display 131. FIG. 3A is arranged to show video data captured by the data capture devices 110. FIG. 3B is a view of the GUI, arranged to show video data captured by camera 3. FIG. 3C is a view of the GUI, arranged to show the video data captured by camera 3 that has been augmented to identify motion detection for camera 1 and camera 2. Consequently, the display 131 presents the combination of the video data captured by camera 3 together with the alerts. The information presented by the GUI depends upon the status of the user. Administrators are provided with permissions to modify settings of the GUI. Viewers who are determined to satisfy the security requirements are granted access to captured video data. The specific arrangement provided by FIGS. 3A-3C illustrates a possible way that video data can be presented using a surveillance apparatus 100 that is configured to perform a surveillance method S200.

FIG. 3A shows that the GUI includes a menu that presents the viewer with a variety of options, including:
"Live", which allows video data that is presently being captured by the surveillance system 100 to be viewed on the display 131;
"Playback", which allows video data that has previously been captured by the surveillance system 100 to be viewed on the display 131;
"Sequence Explorer", although it is not necessary to provide further details in the present disclosure;
"Alarm Manager", which allows an administrator to configure alarms and alerts that are presented by the GUI, the alarm manager being configured so that a single-point alarm function provides a clear and consolidated overview of security and system-related alarms and gives instant access to cameras for immediate detection of incidents;
"Transact", although it is not necessary to provide further details in the present disclosure;
"System Monitor", although it is not necessary to provide further details in the present disclosure.

FIG. 3A shows the GUI arranged to present live data. The GUI includes a plurality of columns, which are populated with information that is presented to the viewer. FIG. 3A illustrates a GUI having three columns, which are used convey details and receive instructions for configuring data that has been captured by the surveillance system 100.

The centre column of the GUI presents the viewer with video data corresponding to camera 3. This video data is displayed prominently, so that the viewer is presented in detail with the video data captured by camera 3.

The right column of the GUI presents the viewer with video data corresponding to the video feed from camera 1 and camera 2. Therefore, at any time, the viewer is presented with the video feed from a plurality of cameras 1-3. Consequently, the viewer can select video data to be displayed prominently. The viewer can select video data presented in the right column in order to display this information prominently in the centre column.

The left column of the GUI presents the viewer with options for configuring the display of video data. The viewer can choose video data to be displayed by selecting the appropriate cameras 1-3, and the viewer also has the possibility of using a search function in order to find a view or a camera that is to be displayed. The viewer has the option of selecting a camera group, such as camera group 5 shown in FIG. 1B. Selecting one or more cameras 1-3 in the left hand column is used to populate the video data that is presented in the centre column and the right column.

FIG. 3B presents an enlarged view that is presented by the GUI that corresponds to the video data that is provided in the centre column of FIG. 3A. In this example, the enlarged view corresponds to video feed of camera 3, in accordance with step S231. The enlarged view occupies the full screen of the display, and so the video feed from camera 1 and camera 2 are no longer displayed to the viewer by the GUI. This presents a problem, because in this configuration the viewer is restricted to viewing activity that is captured by camera 3, and no activity can be viewed that is captured by camera 1 or camera 2, or indeed any other cameras.

FIG. 3C presents the enlarged view of FIG. 3B that has been augmented in accordance with step S230 to include alerts which identify that motion has been detected for data capture devices 110 that are not presently presented by the display. Consequently, the display 131 shows the combination of the video data and the alerts. The alert includes the perimeter that was extracted in step S223 for motion detected by camera 1, the perimeter having been constructed from the perimeter data. The alert further includes an icon 1, which serves to identify the perimeter that corresponds to camera 1. In this example, the icon 1 is shown connected to the perimeter and having the same colour as the perimeter. The icon 1 includes the number "1", which serves to identify camera 1.

The icon 1 serves as a shortcut, and by selecting the icon, the video data presented by the display 131 is changed so that the video feed of camera 1 is presented instead of the video feed from camera 3. As a consequence, it is not necessary for the user to revert to the GUI shown in FIG. 3A in order to select the camera that provides the video in the full-screen mode shown in FIG. 3B.

The interior region enclosed by the perimeter is not filled with any colour. Since the interior region is transparent, the viewer can continue to observe the video feed provided by camera 3. Alternatively, the interior region enclosed by the perimeter 1 includes a semi-transparent layer, which also confers the advantage that the viewer can continue to observe the video feed provided by camera 3. Since the interior region is semi-transparent, the viewer can continue to observe the video feed provided by the camera 3. The use of a semi-transparent layer to fill interior region 1 identifies that the interior region 1 corresponds to camera 1, with the colour of the interior region corresponding to icon 1. It would be possible to fill the interior region with a solid colour, because the viewer could continue to view the part that has not been obscured of the video feed provided by camera 3, although this is not preferable because then the viewer cannot continue to observe the video feed provided by camera 3 that is within the interior region.

As a further alternative, the interior region is filled by the video feed from camera 1, so that the video feed of camera 3 is augmented to include the specific region in camera 1 for which motion is occurring. This will make it even easier for the viewer to identify the moving object. If the alert includes the video feed of camera 1, then this video feed can be presented so that it is semi-transparent, to prevent the video feed from camera 3 becoming obscured by the video feed from camera 1. The presentation of a semi-transparent video feed also serves to indicate to the viewer that the video data from camera 3 has been augmented. Alternatively, another way of indicating to the viewer that the video data from camera 3 has been augmented is for the alert to include the perimeter or by providing an icon that indicates that video data has been added.

Optionally, the perimeter 1 can also serve as a shortcut to the video feed of camera 1. The interior region of the perimeter can serve as a shortcut for presenting the video feed of camera 1 by the display 131. If the interior region 1 is used to identify camera 1, then it is not essential for the alert to include the presentation of the perimeter. Advantageously, the provision of a shortcut ensures that the viewer can change the camera that is being observed, without the need to revert from the full-screen mode to the GUI.

Settings for the presentation of alerts can be chosen by selecting the "Alarm Manager" tab in the menu of FIG. 3A. For the situation in which motion has been detected on more than one camera, an alert is generated for each of these cameras. The administrator may decide that all alerts should be presented to the viewer. Alternatively, the administrator may decide that the alerts should be presented in order of priority. The order of priority can be determined by from a ranking of each of the cameras, or alternatively could be determined following an analysis of the shape of the feature that was identified in step S224 during the motion detection S520.

FIG. 3C further shows an alert corresponding to camera 2, for the situation in which motion has been detected for a further camera, in accordance with step S233. The alert corresponding to camera 2 includes a perimeter and an icon, which are generated in the same way as for camera 1. The icon 2 includes the number "2", which serves to identify camera 2. The perimeter and icon are shown in a different colour, so that the viewer can distinguish the alert corresponding to camera 2 from the alert corresponding to camera 1.

For the situation in which alerts are presented for multiple cameras, a decision needs to be taken of how to present the interior region of the perimeter, to avoid a conflict that could arise if the interior regions overlap. One solution would be for all of the interior regions to be transparent. Alternatively, one of the cameras could be given priority for being presented to include a semi-transparent fill for the interior region, with the interior regions of the other cameras having no fill. A determination is made of how to prioritise the video data that is captured by all of the data capture devices 110. The determination of which video data is given priority is achieved by the administrator selecting appropriate settings of the Alarm Manager. If the shape recognition software determines that the perimeter for camera 1 corresponds to a person, while the perimeter for camera 2 corresponds to a dog, then camera 1 would be given priority, and so the alert corresponding to camera 1 would be prominently displayed to the viewer. A selection unit is configured so that a selection can be made of how the combining unit should combine the perimeter data and the further perimeter data with the video feed captured by the different camera. This is particularly useful in the event that the parameter and the further parameter overlap. The selection unit can be provided, for example, by the processor 123 of the server 120.

Advantageously, the perimeter indicates the features of the moving object, allowing the viewer to monitor more than one camera at the same time. The detection of the shape defined by the perimeter, by either the processor 123 or by the viewer, allows the perimeter to be used to decide whether to view the video feed from the camera associated with the alert. Thus, the shape recognition is performed by shape recognition unit, such as the processor 123 of the server 120. As a consequence, the viewer can ensure that they are viewing the most important video feed, based upon motion that has been detected. The shortcuts facilitate the changing of the video feed, which allows the viewer to continue viewing the full screen displayed in FIG. 3C, without needing to revert to the GUI shown in FIG. 3A. Thus, the alert provides a visual representation that identifies to the viewer that motion has been detected.

As an alternative, the video feed shown prominently in the centre column of the GUI could be augmented in the way described for the full-screen mode. In this situation, it is possible to change the video feed that is shown prominently based upon an alert that corresponds to another available camera, such as the cameras that are accessible via the left column or the right column of the GUI.

The above examples can also be realised by a computer of a system or apparatus (or devices such as a CPU or MPU) that reads out and executes a program recorded on a memory device to perform the functions of the above-described examples, and by a method, the steps of which are performed by a computer of a system or apparatus by, for example, reading out and executing a program recorded on a memory device to perform the functions of the above-described examples. For this purpose, the program is provided to the computer for example via a network or from a recording medium of various types serving as the memory device (e.g., a computer-readable medium such as a non-transitory computer-readable medium).

While the present invention has been described with reference to embodiments, it is to be understood that the invention is not limited to the disclosed embodiments. The present invention can be implemented in various forms without departing from the principal features of the present invention. The scope of the following claims is to be accorded the broadest interpretation so as to encompass all such modifications and equivalent structures and functions.

The invention claimed is:

1. A surveillance apparatus comprising:
one or more processors configured to execute instructions that, when executed by the one or more processors, cause the one or more processors to:
detect a moving object in a field of view of a first camera;
identify a region of the moving object in a first video captured by the first camera;
determine a perimeter of the region of the moving object in the first video, the perimeter tracing a shape of the moving object in the first video;
overlay the perimeter of the region of the moving object in the first video on a second video captured by a second camera which is different from the first camera; and
output the second video, which is captured by the second camera and is to be displayed on a display, on which the perimeter tracing the shape of the moving object in the first video captured by the first camera is overlaid,
wherein an interior region of the perimeter overlaid on the second video is semi-transparent, and
wherein a type of the moving object is identified from the shape that is represented by the perimeter, for controlling display of the perimeter tracing the shape of the moving object based on the identified type.

2. The surveillance apparatus according to claim 1, wherein:
the perimeter of the region of the moving object in the first video and the region of the first video are overlaid on the second video to be displayed on the display.

3. The surveillance apparatus according to claim 1, wherein:
the perimeter of the region of the moving object in the first video and identification of the first camera are overlaid on the second video to be displayed on the display.

4. The surveillance apparatus according to claim 1, wherein:
the perimeter or an interior region of the perimeter, from the first video captured by the first camera, serves as a shortcut to displaying the first video.

5. The surveillance apparatus according to claim 1, wherein the instructions further cause the one or more processors to:
detect a further moving object in a field of view of a further camera;
identify a further region of the further moving object in a further video captured by the further camera;
determine a further perimeter of the further region of the further moving object in the further video; and
overlay the further perimeter on the second video captured by the second camera.

6. The surveillance apparatus according to claim 5, wherein the instructions further cause the one or more processors to be
configured so that a selection can be made of how the one or more processors should combine the perimeter and the further perimeter with the second video captured by the second camera, when the parameter and the further parameter overlap.

7. The surveillance apparatus according to claim 1, further comprising at least one of:
a server configured to perform processing of the first video captured by the first camera that includes the moving object, to determine that motion has been detected; and
a motion sensor configured to inform the server that motion has been detected.

8. The surveillance apparatus according to claim 1, wherein the perimeter tracing the shape of the moving object in the first video overlaps with the second video for displaying, even if any moving objects are not present in the second video.

9. A surveillance method comprising:
detecting a moving object in a field of view of a first camera;
identifying a region of the moving object in a first video captured by the first camera;
determining a perimeter of the region of the moving object in the first video, the perimeter tracing a shape of the moving object in the first video;
overlaying the perimeter of the region of the moving object in the first video on a second video captured by a second camera which is different from the first camera; and
outputting the second video, which is captured by the second camera and is to be displayed on a display, on which the perimeter tracing the shape of the moving object in the first video captured by the first camera is overlaid,
wherein an interior region of the perimeter overlaid on the second video is semi-transparent, and
wherein a type of the moving object is identified from the shape that is represented by the perimeter, for controlling display of the perimeter tracing the shape of the moving object based on the identified type.

10. A non-transitory computer-readable medium storing a program that, when implemented by a surveillance apparatus, causes the surveillance apparatus to perform a surveillance method comprising:
detecting a moving object in a field of view of a first camera;
identifying a region of the moving object in a first video captured by the first camera;
determining a perimeter of the region of the moving object in the first video, the perimeter tracing a shape of the moving object in the first video;
overlaying the perimeter of the region of the moving object in the first video on a second video captured by a second camera which is different from the first camera; and
outputting the second video, which is captured by the second camera and is to be displayed on a display, on which the perimeter tracing the shape of the moving object in the first video captured by the first camera is overlaid,
wherein an interior region of the perimeter overlaid on the second video is semi-transparent, and
wherein a type of the moving object is identified from the shape that is represented by the perimeter, for controlling display of the perimeter tracing the shape of the moving object based on the identified type.

* * * * *